United States Patent
Obayashi et al.

(10) Patent No.: US 9,388,476 B2
(45) Date of Patent: Jul. 12, 2016

(54) STEEL GEAR AND MANUFACTURING METHOD FOR THE SAME

(75) Inventors: Koji Obayashi, Anjo (JP); Keita Taguchi, Anjo (JP); Yasutaka Miyake, Anjo (JP); Takaaki Ogiso, Anjo (JP)

(73) Assignee: AISIN AW CO., LTD., Aichi (JP)

( * ) Notice: Subject to any disclaimer, the term of this patent is extended or adjusted under 35 U.S.C. 154(b) by 307 days.

(21) Appl. No.: 13/984,793

(22) PCT Filed: Mar. 1, 2012

(86) PCT No.: PCT/JP2012/055156
§ 371 (c)(1),
(2), (4) Date: Aug. 9, 2013

(87) PCT Pub. No.: WO2012/132744
PCT Pub. Date: Oct. 4, 2012

(65) Prior Publication Data
US 2013/0312560 A1    Nov. 28, 2013

(30) Foreign Application Priority Data
Mar. 31, 2011 (JP) ................ 2011-077746

(51) Int. Cl.
*F16H 55/17* (2006.01)
*C21D 9/32* (2006.01)
(Continued)

(52) U.S. Cl.
CPC .. *C21D 9/32* (2013.01); *C21D 1/10* (2013.01); *C22C 38/00* (2013.01); *C23C 8/22* (2013.01);
(Continued)

(58) Field of Classification Search
CPC .......... C22C 1/02; C22C 38/04; C22C 38/02; C22C 38/00; C22C 38/18; F16H 55/06; F16H 55/17; C23C 8/22; C23C 8/80; C21D 9/32; C21D 1/10; C21D 2221/00
USPC ............ 148/233, 319, 219, 320; 74/437, 438, 74/219, 434; 29/893.3
See application file for complete search history.

(56) References Cited

U.S. PATENT DOCUMENTS
4,533,004 A  *  8/1985  Ecer ............... E21B 10/006
                                                175/379
6,325,867 B1 * 12/2001  Okita ................. C21D 1/78
                                                148/226
(Continued)

FOREIGN PATENT DOCUMENTS
WO      2007/034911 A1    3/2007
WO   WO 2011122650 A1 * 10/2011 ............... C21D 1/06

OTHER PUBLICATIONS
International Search Report of PCT/JP2012/055156 dated May 22, 2012.

*Primary Examiner* — William Kelleher
*Assistant Examiner* — Zakaria Elahmadi
(74) *Attorney, Agent, or Firm* — Sughrue Mion, PLLC

(57) ABSTRACT

A steel gear includes a substantially cylindrical outer peripheral ring portion having a toothed shape formed on its outer peripheral surface; and a flange portion extended radially inward from an inner peripheral surface of the outer peripheral ring portion. The steel gear has a thermal history layer formed in the outer peripheral ring portion, and the depth of the thermal history layer in the direction inward from the tooth bottom of the toothed shape of the outer peripheral surface is greater in the first protruding portion and the second protruding portion than in the coupling portion with the flange portion, and is substantially the same between the first protruding portion and the second protruding portion. As a result, even if the "carburization/slow cooling/high-frequency quenching treatment" is used as a manufacturing method of the steel gear, the steel gear has high dimensional accuracy.

3 Claims, 11 Drawing Sheets

(51) Int. Cl.
*C21D 1/10* (2006.01)
*C23C 8/22* (2006.01)
*C23C 8/80* (2006.01)
*F16H 55/06* (2006.01)
*C22C 38/00* (2006.01)

(52) U.S. Cl.
CPC *C23C 8/80* (2013.01); *F16H 55/06* (2013.01); *F16H 55/17* (2013.01); *Y02P 10/253* (2015.11); *Y10T 29/49467* (2015.01); *Y10T 74/1987* (2015.01)

(56) References Cited

U.S. PATENT DOCUMENTS

| | | | | |
|---|---|---|---|---|
| 6,620,262 B1* | 9/2003 | Okita | ............... | B21K 1/04 148/226 |
| 7,641,850 B2* | 1/2010 | Sontti | ............... | B21H 5/022 148/573 |
| 7,988,796 B2* | 8/2011 | Ohbayashi | ............... | B23P 15/00 148/223 |
| 7,998,282 B2 | 8/2011 | Taniguchi et al. | | |
| 2002/0179188 A1* | 12/2002 | Yamaguchi | ............... | C21D 9/32 148/218 |
| 2005/0133120 A1* | 6/2005 | Walenta | ............... | C21D 1/06 148/233 |
| 2006/0105194 A1* | 5/2006 | Kinstler | ............... | C22F 1/183 428/660 |
| 2007/0102068 A1* | 5/2007 | Taniguchi | ............... | C21D 1/06 148/222 |
| 2008/0095657 A1* | 4/2008 | Burnett | ............... | C21D 1/02 420/106 |
| 2009/0301608 A1* | 12/2009 | Taniguchi | ............... | C21D 1/00 148/319 |
| 2012/0018050 A1* | 1/2012 | Kubota | ............... | C21D 9/32 148/219 |
| 2012/0247249 A1* | 10/2012 | Obayashi | ............... | H01L 51/052 74/434 |
| 2012/0297911 A1* | 11/2012 | Geiman | ............... | B21K 1/30 74/434 |

* cited by examiner

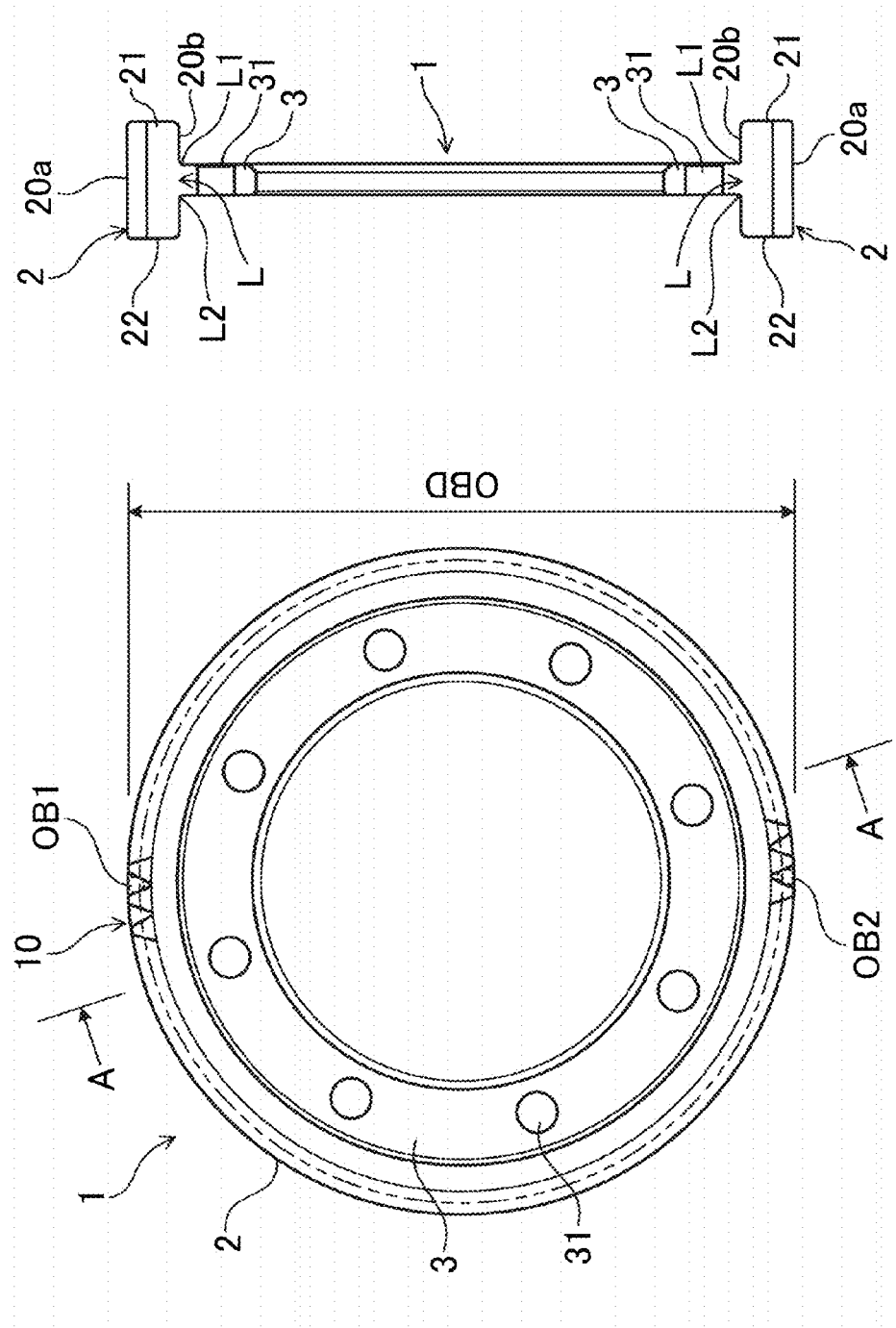

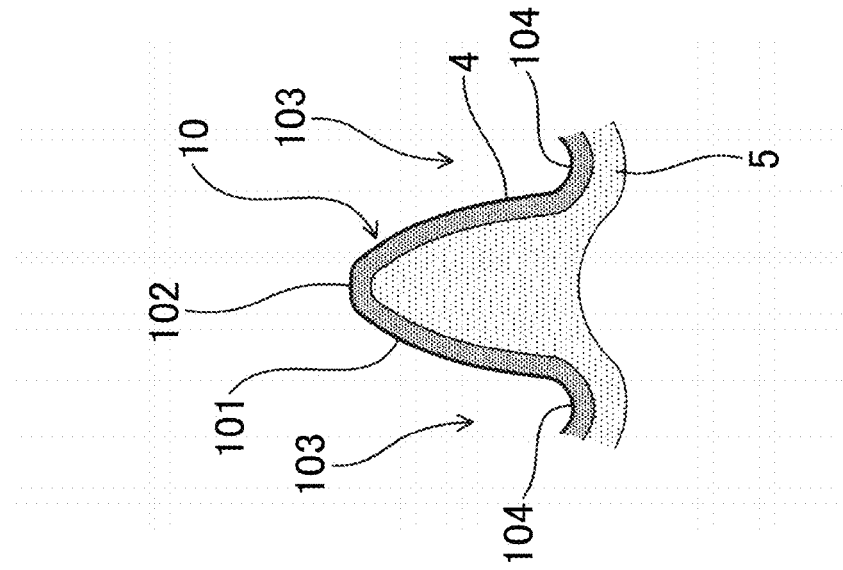
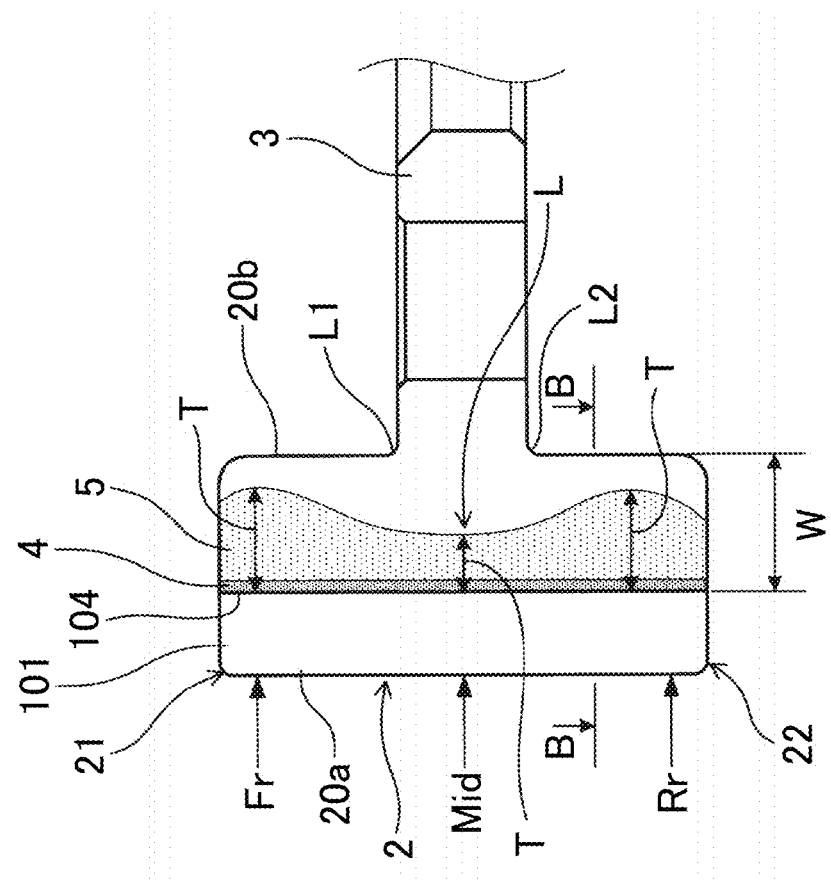

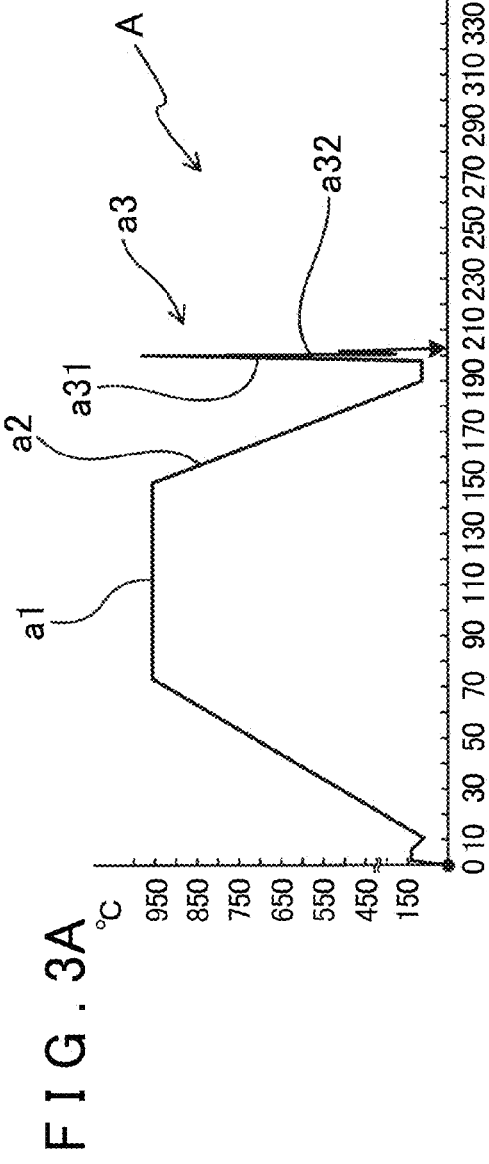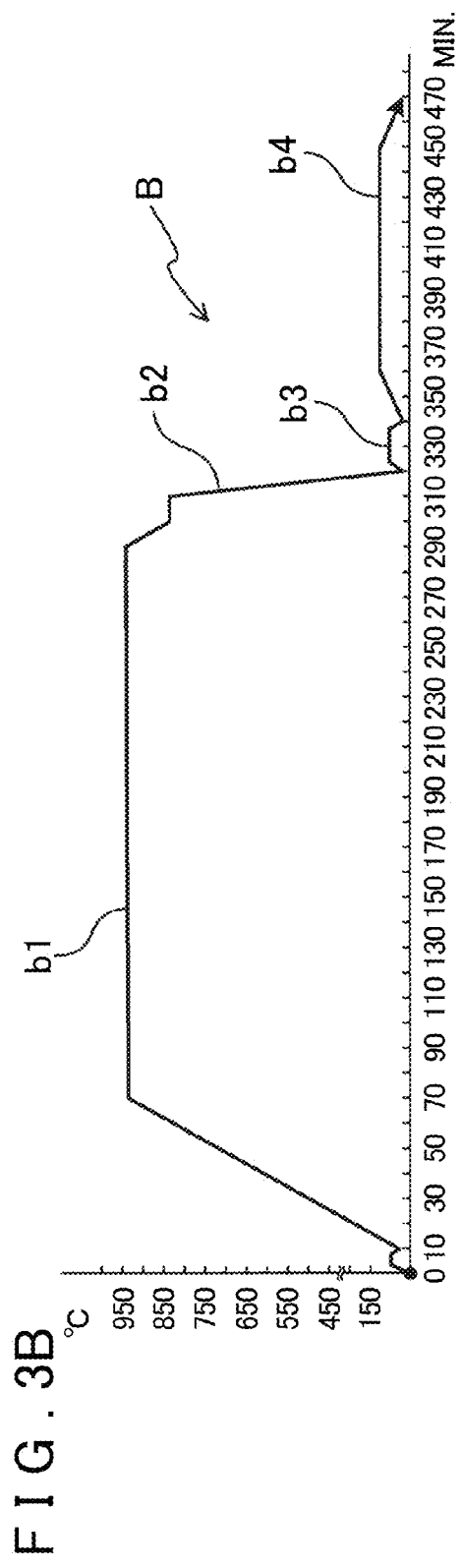

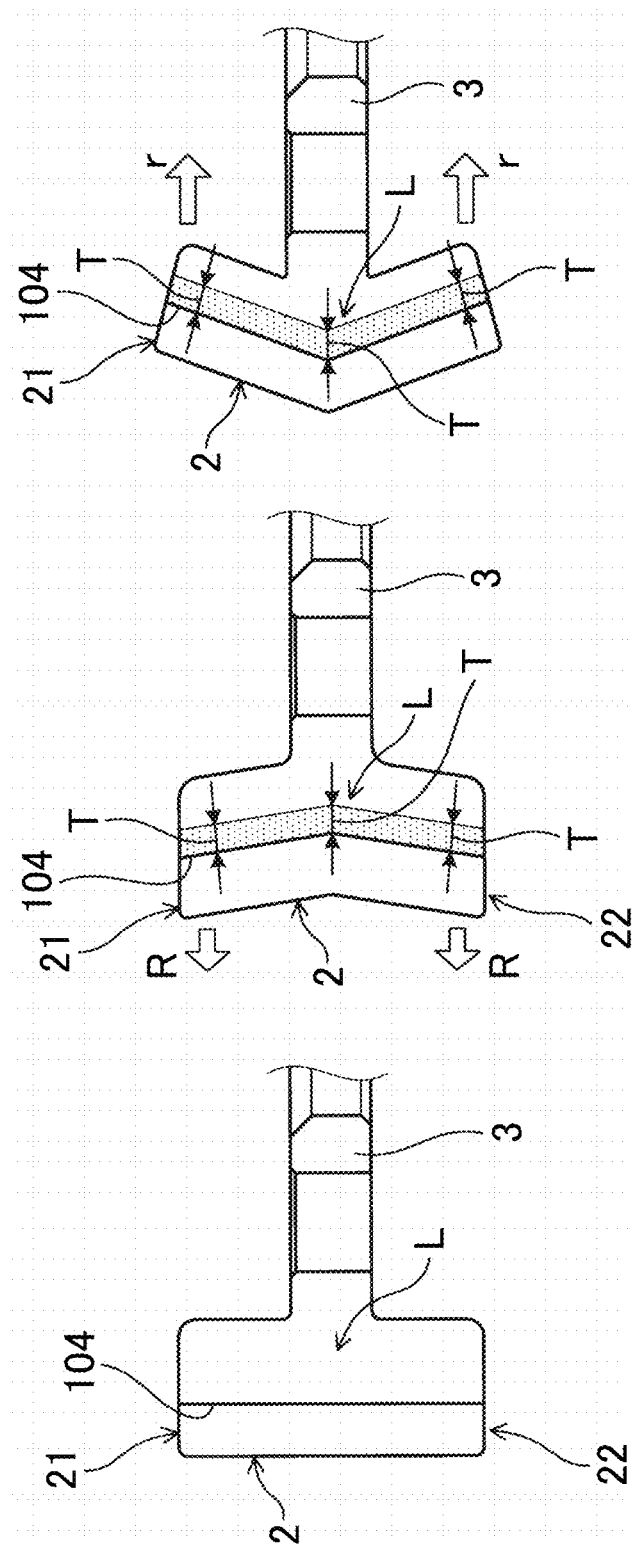

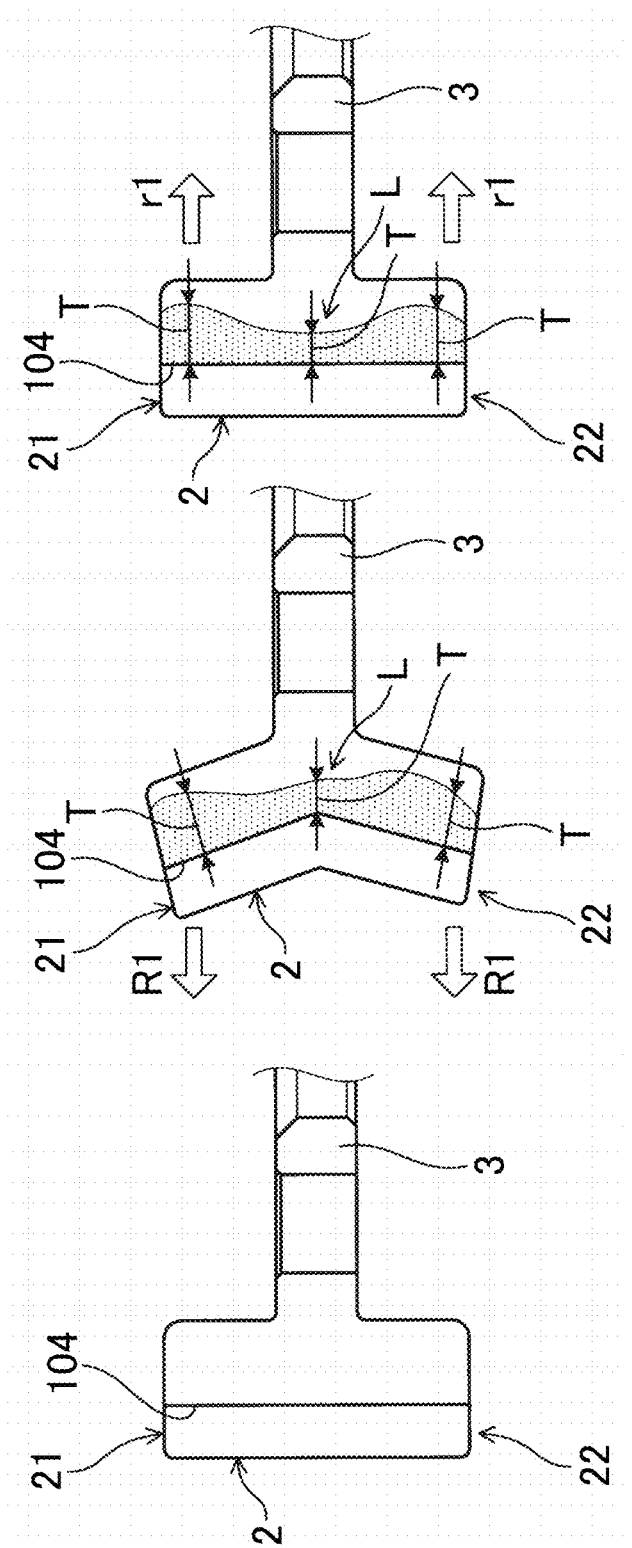

STEEL GEAR AND MANUFACTURING METHOD FOR THE SAME

CROSS REFERENCE TO RELATED APPLICATIONS

This is a National Stage of International Application No. PCT/JP2012/055156 filed Mar. 1, 2012, claiming priority based on Japanese Patent Application No. 2011-077746 filed Mar. 31, 2011, the contents of all of which are incorporated herein by reference in their entirety.

INCORPORATION BY REFERENCE

The disclosure of Japanese Patent Application No. 2011-077746 filed on Mar. 31, 2011 including the specification, drawings and abstract is incorporated herein by reference in its entirety.

BACKGROUND OF THE INVENTION

The present invention relates to steel gears and manufacturing methods for steel gears.

DESCRIPTION OF THE RELATED ART

Conventionally, steel gears are used in various industrial fields. For example, differential devices for use in the automotive field have a large number of steel gears. There are steel gears having various shapes. For example, those gears are widely known in the art which include a cylindrical outer peripheral ring portion having a toothed shape formed on its outer peripheral surface, and a flange portion coupled to the central position of the inner peripheral surface of the outer peripheral ring portion in the axial direction.

Steel gears are members for which high strength and wear resistance are required. Thus, the steel gears are often subjected to a carburization treatment and a quenching treatment as treatments that increase surface hardness while toughness is maintained. The carburization treatment is a treatment of increasing carbon concentration at the surface of steel heated to an austenitizing temperature or higher. Typically, the quenching treatment is performed immediately after the carburization treatment. Performing the carburization treatment and the quenching treatment on the tooth-shaped surface of the steel gear can ensure internal toughness of the gear and can increase surface hardness of the tooth-shaped surface.

A conventionally known method to perform the carburization treatment and the quenching treatment is to perform oil-quenching immediately after a gas carburization treatment is performed for a long time by using a large heat-treating furnace including an oil-quenching tank on its outlet side. Recently, as disclosed in International Patent Application Publication No. 2007/034911 (WO2007/034911), another method has been proposed in which a steel member is slowly cooled after a vacuum carburization treatment, and a quenching treatment is performed after a desired part of the steel member is reheated by high-frequency induction heating (hereinafter quenching using high-frequency induction heating will occasionally be referred to as the "high-frequency quenching").

SUMMARY OF THE INVENTION

The "carburization/slow cooling/high-frequency quenching treatment" of slowly cooling a member after a carburization treatment, and then quenching the member by rapidly cooling the member immediately after heating a desired part of the member by high-frequency induction heating need not use fire and oil and can reduce the heat treatment time, as compared to the conventional "carburization/oil-quenching treatment" of oil-quenching a member after a gas carburization treatment. The carburization/slow cooling/high-frequency quenching treatment can thus reduce $CO_2$ emission, and is therefore an earth-friendly heat treatment technique.

However, in the case where the conventional "carburization/slow cooling/high-frequency quenching treatment" is simply applied to the steel gear material having the flange portion coupled to the central position of the inner peripheral surface of the outer peripheral ring portion in the axial direction, a steel gear having sufficient dimensional accuracy may not be produced due to distortional deformation of the outer peripheral ring portion caused by heat treatment. In particular, in OBD evaluation in which balls are placed in two opposing tooth grooves of the steel gear and the outer peripheral dimensions are evaluated, an OBD taper as the difference between the OBD value in the central portion in the lateral direction of the teeth and a larger one of the OBD values at both ends may be increased.

The present invention was developed in view of the above problems, and it is an object of the present invention to provide a steel gear having higher dimensional accuracy than conventional examples. It is also an object of the present invention to provide a manufacturing method capable of producing a steel gear having higher dimensional accuracy than conventional examples.

According to a first aspect of the present invention, a steel gear includes: a substantially cylindrical outer peripheral ring portion having a toothed shape formed on its outer peripheral surface; and a flange portion extended radially inward from an inner peripheral surface of the outer peripheral ring portion, in which the outer peripheral ring portion includes a first protruding portion protruding to one side in an axial direction with respect to a coupling portion with the flange portion, and a second protruding portion protruding to the other side in the axial direction with respect to the coupling portion with the flange portion, and an axial length of the first protruding portion is substantially equal to that of the second protruding portion, a carburized layer that is formed in a surface layer of the toothed shape and a thermal history layer that is formed in a region including the carburized layer and having a greater depth in a direction inward from the outer peripheral surface than a depth of the carburized layer and that has a history of having been heated to austenite by high-frequency induction heating are formed in the outer peripheral ring portion, and a depth of the thermal history layer in a direction inward from a tooth bottom of the toothed shape of the outer peripheral surface is greater in the first protruding portion and the second protruding portion than in the coupling portion with the flange portion, and is substantially the same between the first protruding portion and the second protruding portion.

According to a second aspect of the present invention, a method for manufacturing a steel gear includes: a preparing step of preparing a steel gear material that includes a substantially cylindrical outer peripheral ring portion having a toothed shape formed on its outer peripheral surface, and a flange portion extended radially inward from an inner peripheral surface of the outer peripheral ring portion, the outer peripheral ring portion including a first protruding portion protruding to one side in an axial direction with respect to a coupling portion with the flange portion, and a second protruding portion protruding to the other side in the axial direction with respect to the coupling portion with the flange portion, and an axial length of the first protruding portion being substantially equal to that of the second protruding portion; a carburizing step of heating the steel gear material to an austenitizing temperature or higher in a carburizing gas under a reduced pressure to form a carburized layer in a surface layer of the toothed shape; a cooling step of, after the carburizing step, cooling the steel gear material at a cooling rate lower than a cooling rate that causes martensitic transformation, and cooling the steel gear material to a temperature equal to or lower than that at which structural transformation by cooling is completed; and a quenching step of heating a region of the steel gear material, which includes the carburized layer and has a greater depth in a direction inward from the outer peripheral surface than a depth of the carburized layer, to austenite by high-frequency induction heating, and then cooling the steel gear material at a cooling rate equal to or higher than the cooling rate that causes martensitic transformation. In the method, in the quenching step, a heating depth of the high-frequency induction heating in a direction inward from a tooth bottom of the toothed shape of the outer peripheral surface is adjusted so as to be greater in the first protruding portion and the second protruding portion than in the coupling portion with the flange portion and to be substantially the same between the first protruding portion and the second protruding portion.

The steel gear has the thermal history layer formed in the outer peripheral ring portion, and the depth of the thermal history layer in the direction inward from the tooth bottom of the toothed shape of the outer peripheral surface is greater in the first protruding portion and the second protruding portion than in the coupling portion with the flange portion, and is substantially the same between the first protruding portion and the second protruding portion. The steel gear uses the thermal history layer having this configuration. Accordingly, even if the "carburization/slow cooling/high-frequency quenching treatment" is used as a manufacturing method of the steel gear, the steel gear has high dimensional accuracy as long as the thermal history layer having this configuration is implemented.

The manufacturing method described above is a method capable of suitably manufacturing the steel gear described above. In this manufacturing method, a steel gear material that includes a substantially cylindrical outer peripheral ring portion having a toothed shape formed on its outer peripheral surface, and a flange portion extended radially inward from an inner peripheral surface of the outer peripheral ring portion is prepared in the preparing step. The outer peripheral ring portion of the steel gear material includes a first protruding portion protruding to one side in an axial direction with respect to a coupling portion with the flange portion, and a second protruding portion protruding to the other side in the axial direction with respect to the coupling portion with the flange portion, and an axial length of the first protruding portion is substantially equal to that of the second protruding portion. That is, in the steel gear material, the flange portion is coupled substantially to a central position of the inner peripheral surface of the outer peripheral ring portion in the axial direction. In this manufacturing method, the "carburization/slow cooling/high-frequency quenching treatment" is applied to the steel gear material having such a shape.

That is, in the carburizing step, the steel gear material is heated to an austenitizing temperature or higher in a carburizing gas under a reduced pressure to form a carburized layer in a surface layer of the toothed shape. Thus, the carburized layer having higher carbon concentration than the base material is introduced along an outline of the toothed shape. After the carburizing step, in the cooling step, the steel gear material is cooled at a cooling rate lower than a cooling rate that causes martensitic transformation, and the steel gear material is cooled to a temperature equal to or lower than that at which structural transformation by cooling is completed. Thus, a steel gear material can be obtained which contains substantially no martensitic structure in the outer peripheral ring portion.

Thereafter, in the quenching step, a region of the steel gear material, which includes the carburized layer and has a greater depth in a direction inward from the outer peripheral surface than a depth of the carburized layer, is heated to austenite by high-frequency induction heating, and then the steel gear material is cooled at a cooling rate equal to or higher than the cooling rate that causes martensitic transformation. Thus, the carburized layer is transformed into a martensitic structure, and hardness of the surface layer of the toothed shape is increased. A thermal history layer having a history of having been heated to austenite by high-frequency induction heating is formed in the region including the carburized layer and having a greater depth in the direction inward from the outer peripheral surface than the depth of the carburized layer.

What should be noted in the quenching step is that a heating depth of the high-frequency induction heating in a direction inward from a tooth bottom of the toothed shape of the outer peripheral surface is adjusted so as to be greater in the first protruding portion and the second protruding portion than in the coupling portion with the flange portion and to be substantially the same between the first protruding portion and the second protruding portion.

Conventionally, in the case where high-frequency quenching is applied to a steel gear material having the shape described above, the heating depth of the high-frequency induction heating in the direction inward from the tooth bottom of the toothed shape of the outer peripheral surface is normally adjusted so as to be uniform along the entire axial length of the outer peripheral portion. However, such adjustment results in distortional deformation in the outer peripheral ring portion due to the heat treatment, and sufficient dimensional accuracy cannot be obtained. In particular, an OBD taper of the outer peripheral ring portion is often increased.

However, in the case where the heating depth of the high-frequency induction heating in the direction inward from the tooth bottom of the toothed shape of the outer peripheral surface is adjusted so as to be greater in the first protruding portion and the second protruding portion than in the coupling portion with the flange portion and to be substantially the same between the first protruding portion and the second protruding portion as described above, the dimensional accuracy of the steel gear after the quenching step can be improved. In particular, the OBD taper of the outer peripheral ring portion can be reduced. This knowledge has not been acquired prior to the present invention. The reason for this is considered as follows.

The following mechanism is possible in the case where the heating depth of the high-frequency induction heating in the direction inward from the tooth bottom of the toothed shape of the outer peripheral surface of the outer peripheral ring portion is adjusted to a uniform depth along the entire axial length of the outer peripheral ring portion as in conventional examples. The coupling portion with the flange portion in the outer peripheral ring portion is subjected to a large constraining force of the flange portion. On the other hand, the distal ends of the first protruding portion and the second protruding portion are subjected to a smaller constraining force of the flange portion than the coupling portion because they are separated from the flange portion. Accordingly, in the high-frequency induction heating, the distal end sides of the first protruding portion and the second protruding portion are slightly deformed radially outward to approximately the same extent by thermal expansion, and the coupling portion is less likely to be deformed radially outward by thermal expansion as compared to the distal end sides. When cooling is performed by quenching in this state, the coupling portion is less likely to be deformed radially inward due to the presence of the flange portion, but the distal end sides of the first protruding portion and the second protruding portion having no flange portion are deformed radially inward to a large extent. A steel gear having a deformed shape with a large OBD taper is thus produced in conventional manufacturing methods.

On the other hand, the following mechanism is possible in the case where the heating depth of the high-frequency induction heating in the direction inward from the tooth bottom of the toothed shape of the outer peripheral surface is adjusted so as to be greater in the first protruding portion and the second protruding portion than in the coupling portion with the flange portion and to be substantially the same between the first protruding portion and the second protruding portion. In the case where the heating depth is adjusted in this manner, the distal end side of the first protruding portion and the distal end side of the second protruding portion are more significantly deformed radially outward to approximately the same extent in the high-frequency induction heating as compared to the case where the heating depth is adjusted to a uniform depth. When cooling is performed by quenching in this state, the distal end side of the first protruding portion and the distal end side of the second protruding portion are deformed radially inward to approximately the same extent as that in the high-frequency induction heating. A steel gear having a shape with a small OBD taper is thus finally produced.

According to the above manufacturing method, since the region including the carburized layer and having a greater depth in the direction inward from the tooth bottom of the toothed shape of the outer peripheral surface than the depth of the carburized layer is partially subjected to high-frequency quenching, internal hardness is increased. Accordingly, a steel gear having high dimensional accuracy and high strength can be produced which is suitable for, e.g., high torque transfer gears such as differential gears for which high dimensional accuracy is required and in which not only the surface layer of the toothed shape but also the inside thereof are subjected to a stress. Moreover, strength can be increased to approximately the same extent without performing a shot-peening treatment, as compared to steel gears with the same shape which are produced by using the conventional "carburization/oil-quenching treatment in which oil-quenching is performed after a gas carburization treatment.

The above manufacturing method uses neither fire nor oil and can reduce the heat treatment time, as compared to the conventional "carburization/oil-quenching treatment." Thus, the above manufacturing method can reduce $CO_2$ emission and is earth-friendly. Moreover, the length of the heat treatment line can be reduced. Accordingly, a compact manufacturing line of steel gears can be configured.

As described above, the present invention can provide a steel gear having higher dimensional accuracy than conventional examples. The present invention can also provide a manufacturing method capable of producing a steel gear having higher dimensional accuracy than conventional examples.

BRIEF DESCRIPTION OF THE DRAWINGS

FIGS. 1A and 1B illustrate a steel gear (differential gear) according to a first embodiment, where FIG. 1A is a plan view, and FIG. 1B is an A-A sectional view;

FIGS. 2A and 2B illustrate an outer peripheral ring portion of the steel gear according to the first embodiment, where FIG. 2A is a sectional view schematically showing a cut surface along a tooth bottom, and FIG. 2B is a sectional view schematically showing a part of a B-B section;

FIG. 3A illustrates an example of a heat pattern in a method for manufacturing a steel gear according to the first embodiment, and FIG. 3B illustrates an example of a heat pattern in a conventional method for manufacturing a steel gear by using a carburization oil-quenching treatment;

FIGS. 8A to 8C illustrate a possible mechanism in which a steel gear having a shape with a large OBD taper is obtained in the method for manufacturing a steel gear according to the first comparative example, where FIG. 8A shows the state before a carburization step, FIG. 8B shows the state during high-frequency induction heating in a quenching step, and FIG. 8C shows the state after cooling in the quenching step;

FIGS. 9A to 9C illustrate a possible mechanism in which a steel gear in a shape with a small OBD taper is obtained in the method for manufacturing a steel gear according to the first embodiment, where FIG. 9A shows the state before a carburization step, FIG. 9B shows the state during high-frequency induction heating in a quenching step, and FIG. 9C shows the state after cooling in the quenching step;

FIG. 10A shows an image of a metallic structure of a carburized layer, FIG. 10B shows an image of a metallic structure of a thermal history layer, and FIG. 10C shows an image of a metallic structure located inward of the thermal history layer; and FIG. 10D shows the cut surface of the steel gear.

DETAILED DESCRIPTION OF THE EMBODIMENTS

Figure 4:
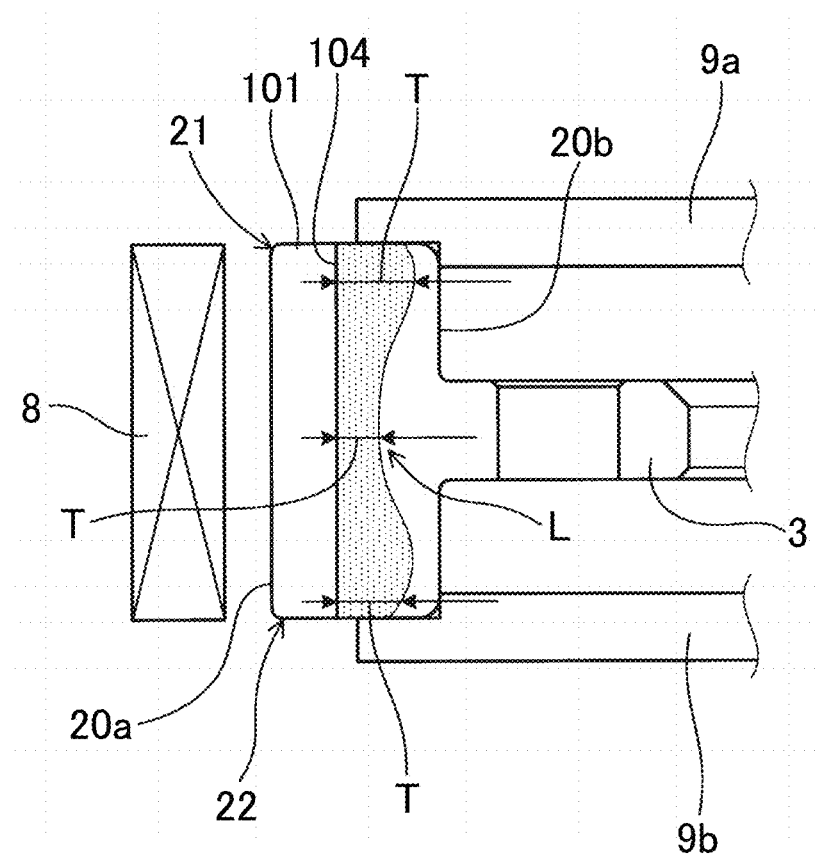
FIG. 4 illustrates a condition during high-frequency induction heating in the method for manufacturing a steel gear according to the first embodiment.

In the above steel gear, the axial length of the first protruding portion of the outer peripheral ring portion is substantially the same as that of the second protruding portion. As used herein, the "axial length of the first protruding portion" is the distance from the coupling position of the flange portion, which is coupled to the inner peripheral surface of the outer peripheral ring portion on the first protruding portion side to the distal end of the first protruding portion. The "axial length of the second protruding portion" is the distance from the coupling position of the flange portion, which is coupled to the inner peripheral surface of the outer peripheral ring portion, on the second protruding portion side to the distal end of the second protruding portion. The expression "the axial length is substantially the same" includes not only the case where the first protruding portion and the second protruding portion have exactly the same axial length, but also the case where the steel gear is designed so that the first protruding portion and the second protruding portion have the same axial length, but the axial length of the first protruding portion is actually slightly different from that of the second protruding portion due to manufacturing variation etc., namely the case where the axial length of the first protruding portion can be regarded as being substantially the same as that of the second protruding portion.

Basic chemical components of the steel material forming the steel gear are preferably such that the C content is in the range of 0.1 to 0.4 mass %, and more preferably in the range of 0.15 to 0.25 mass %. The "basic chemical components" mean basic chemical components of a base material before carbon concentration in a surface layer is increased by a carburization treatment, namely basic chemical components of steel itself. If the lower limit of the C content is 0.15 mass % or more, internal strength of the gear can be more easily ensured. If the upper limit of the C content is 0.25 mass % or less, toughness and cutting ability of the steel gear can be easily made in a satisfactory range. Various components that are optimal for carburization can be selected as the other chemical components.

Specific examples of the steel material as the base material forming the steel gear include SCM420 (JIS) and various known steels for carburization having a C content in the above range.

The carburized layer of the outer peripheral ring portion can be made to be present, e.g., along the outline of the toothed shape formed on the outer peripheral surface. The carburized layer is quenched after high-frequency induction heating described below, and has higher hardness than the base material. Carbon concentration of the carburized layer is higher than that of the base material of the steel material forming the steel gear. The carbon concentration of the carburized layer is preferably 0.50 to 0.90%, and more preferably 0.50 to 0.70% in view of wear resistance, pitting strength, etc. which can achieve surface hardness desirable as an automobile part such as a differential gear.

The thermal history layer of the outer peripheral ring portion is a layer that is present in a region including the carburized layer and having a greater depth in the direction inward from the outer peripheral surface than the depth of the carburized layer. A portion of the thermal history layer corresponding to a tooth of the toothed shape formed in the outer peripheral surface may be present in a region including the carburized layer formed in the surface of the tooth, and extending from a tooth tip to a root circle, or may be present in a region radially inward of the root circle. A portion of the thermal history layer corresponding to the tooth groove between the teeth of the toothed shape formed in the outer peripheral surface is present in a region including the carburized layer formed in the surface of the tooth bottom and having a greater depth in the direction inward from the tooth bottom than the depth of the carburized layer.

The thermal history layer is a layer having a history of having been heated to austenite by high-frequency induction heating. Thus, the thermal history layer has a different metallic structure from that of a region that is located inward of the thermal history layer and that has not been heated to austenite by high-frequency induction heating. Accordingly, if the steel gear is cut along the tooth bottom, the thermal history layer located inward of the tooth bottom and the region located inward of the thermal history layer can be distinguished from each other in a simple manner based on coloring of the cut surface due to the difference in metallic structure, and in a detailed manner based on metallographic observation of the cut surface. Similarly, the thermal history layer that is present in the region from the tooth tip to the tooth bottom and the thermal history layer that can be present in the region located inward of the tooth bottom can be found by cutting a tooth in a direction perpendicular to the axial direction.

The above steel gear is configured so that the depth of the thermal history layer in the direction inward from the tooth bottom of the toothed shape of the outer peripheral surface is greater in the first protruding portion and the second protruding portion than in the coupling portion with the flange portion, and is substantially the same between the first protruding portion and the second protruding portion. That is, in the case where the steel gear is cut along the tooth bottom and the cut surface is examined, the steel gear has such depth distribution that the depth of the thermal history layer is greater in the first protruding portion and the second protruding portion than in the coupling portion with the flange portion. This depth distribution has a depth peak of the thermal history layer on both the first protruding portion side and the second protruding portion side, and these two depth peaks are substantially the same.

Preferably, the steel gear is configured so that T/W in the first protruding portion and T/W in the second protruding portion are larger than T/W in the coupling portion with the flange portion, and T/W in the first protruding portion is substantially equal to T/W in the second protruding portion, where T represents the depth of the thermal history layer in the direction inward from the tooth bottom of the toothed shape of the outer peripheral surface, and W represents a distance from the tooth bottom of the toothed shape of the outer peripheral surface to the inner peripheral surface.

In this case, the depths of the thermal history layer in the first protruding portion and the second protruding portion are adjusted in view of the distance from the tooth bottom of the toothed shape of the outer peripheral surface to the inner peripheral surface. Accordingly, this steel gear has high dimensional accuracy with a small OBD taper in the outer peripheral ring portion. Moreover, this steel gear has high strength because not only the carburized layer but also the portion located inward of the carburized layer have high hardness.

In this case, as in the case described above, the steel gear can be configured to have such depth distribution that T/W in the first protruding portion and T/W in the second protruding portion are larger than T/W in the coupling portion with the flange portion, and T/W in the first protruding portion is substantially equal to T/W in the second protruding portion. That is, such depth distribution can be obtained that has a T/W peak on both the first protruding portion side and the second protruding portion side, and these two T/W peaks are substantially the same.

Regarding the thermal history layer, the expression "the depth or T/W is substantially the same" includes not only the case where the depth of the thermal history layer or T/W is exactly the same between the first protruding portion and the second protruding portion, but also the case where the depth of the thermal history layer or T/W is somewhat different between the first protruding portion and the second protruding portion due to manufacturing variation etc., but can be regarded as being substantially the same between the first protruding portion and the second protruding portion because the same effects as those of the present invention can be obtained. The same applies to the expression "the heating depth or T/W is substantially the same" regarding high-frequency induction heating described below.

In view of the balance between the effect of improving dimensional accuracy and increase in strength by increase in internal strength, T/W in the first protruding portion and the second protruding portion is preferably in the range of 30 to 60%, more preferably 35 to 55%, and more preferably 40 to 50%. T/W in the coupling portion with the flange portion is preferably in the range of 10 to 35%, and more preferably 15 to 30%. In the case where T/W in the first protruding portion and the second protruding portion and T/W in the coupling portion with the flange portion are selected from an overlapping range, this selection is made so that T/W in the first protruding portion and the second protruding portion is larger than that in the coupling portion with the flange portion.

Preferably, in the outer peripheral ring portion of the above steel gear, the carburized layer is comprised of a martensitic structure, the thermal history layer other than the carburized layer is comprised of a ferritic-martensitic structure, and a portion located inward of the thermal history layer is comprised of a ferrite-pearlite structure.

In this case, the steel gear has a good balance between dimensional accuracy and strength. Accordingly, the steel gear can be preferably used as, e.g., high torque transfer gears such as differential gears for which high dimensional accuracy is required and in which not only the surface layer of the toothed shape but also the inside thereof are subjected to a stress.

Each step in the method for manufacturing the steel gear is preferably performed as follows. Specifically, it is effective to perform the carburizing step in a carburizing gas under a reduced pressure lower than the atmospheric pressure. In this case, the carburization treatment can be performed by using a relatively small amount of carburizing gas while the inside of a high-temperature carburizing furnace is maintained in the reduced pressure state. Accordingly, the carburization treatment can be more efficiently performed than conventional examples. Moreover, it is not necessary to perform a heat treatment for a long time by using a conventional large heat-treating furnace. This can reduce treatment time and consumption energy, and can reduce the size of a carburization/quenching facility itself.

The carburizing step is preferably performed under a reduced pressure of 1 to 100 hPa. Using the reduced pressure of 1 hPa or higher for carburization is advantageous in that an expensive facility is not needed to maintain the degree of vacuum. Using the reduced pressure of 100 hPa or less for carburization is advantageous in that soot is less likely to be produced during carburization and unevenness of carburization concentration is less likely to occur. For example, hydrocarbon gases such as acetylene, propane, butane, methane, ethylene, and ethane can be used as the carburizing gas.

The carburizing step is preferably performed under such conditions that surface carbon concentration of the tooth surface of the steel gear material after the carburization treatment is in the range of 0.50% to 0.70%. In this case, the carbon content of the carburized layer is made equal to or lower than that of eutectoid steel so that the carburized layer can be easily transformed into austenite by heating in the quenching treatment and transformed into a martensitic structure by the subsequent rapid cooling without deposition of cementite.

The cooling step is performed at least under such slow cooling conditions that the steel gear material is cooled at a cooling rate lower than the cooling rate that causes martensitic transformation during cooling. This can suppress occurrence of distortion associated with the martensitic transformation, whereby the carburization treatment can be completed with high shape accuracy.

More specifically, the cooling step is preferably performed at least under such slow cooling conditions that the steel gear material is cooled at a cooling rate of 0.1° C./sec. to 3.0° C./sec. while the temperature of the steel gear material is equal to or higher than an Al transformation temperature. If the cooling rate is 3.0° C./sec. or less, a sufficient effect of suppressing occurrence of distortion during cooling can be easily obtained. If the cooling rate in the cooling step is 0.1° C./sec. or more, it is less likely that it takes a long time for the steel gear material to reach the Al transformation temperature. Accordingly, the speed of diffusion of the carburized carbon into the steel is less likely to vary, and consequently, variation in carbon concentration can be easily suppressed.

The cooling step is preferably performed in a cooling gas having a reduced pressure lower than the atmospheric pressure. This can further suppress occurrence of distortion during cooling.

In the case of using the cooling step that uses the effect obtained by depressurizing the cooling gas, the manufacturing method can proceed to the subsequent quenching step with occurrence of distortion of the steel gear material being suppressed. This effect can be maximized in the case of using slow cooling using a lower cooling rate and performing the slow cooling under a reduced pressure. In addition, a steel gear after quenching can be more easily made to have high dimensional accuracy with a small amount of distortion, by using the advantages of the quenching step using the high-frequency induction heating described above.

In the case where reduced pressure carburization is used in the carburizing step, reduced pressure cooling is used in the cooling step, and the carburizing step and the cooling step are successively performed, a reduced pressure carburizing chamber and a reduced pressure cooling chamber can be directly connected together in an actual facility. This eliminates the need to provide a preliminary chamber etc. between both chambers in order that the degree of depressurization is adjusted. That is, in this case, since both the carburizing step and the cooling step are performed in a reduced pressure state, the pressure difference between these steps can be reduced. This allows the steel gear material after the reduced pressure carburization treatment to be subjected to the reduced pressure cooling treatment without being exposed to a normal pressure state, whereby an efficient treatment that suppresses occurrence of distortion can be achieved.

The cooling gas in the cooling step preferably has a reduced pressure of 100 hPa to 650 hPa. If this pressure is higher than the range of 100 to 650 hPa in the reduced pressure cooling treatment, a sufficient effect may not be obtained by the depressurization. It may be difficult to make the reduced pressure lower than this range in terms of facility configuration. Accordingly, it is more preferable that the reduced pressure state of the cooling gas be in the range of 100 hPa to 300 hPa.

In the quenching step, it is preferable that a temperature in a relatively low range (e.g., 750° C. to 950° C.) be selected as an austenitizing temperature of steel, and the high-frequency induction heating be performed with relatively low input energy for a relatively long heating time. Specifically, the lower limit of the heating time is preferably 10 seconds, more preferably 15 seconds, and more preferably 20 seconds. In view of productivity etc., the upper limit of the heating time is preferably 35 seconds, more preferably 30 seconds, and more preferably 25 seconds.

In the case where the heating time is relatively long, the steel gear material tends to be heated to a deep portion having a depth of 1 mm or more from the surface by heat transmission. That is, if the high-frequency induction heating is thus performed at a low temperature for a long time, not only the region of the carburized layer but also a region deep inside can be heated. In this case, since the flange portion is present substantially at the central position of the inner peripheral surface of the outer peripheral ring portion, heat is dissipated by the coupling portion with the flange portion of the outer peripheral ring portion. Since the heat is less likely to be dissipated by the flange portion in the first protruding portion and the second protruding portion of the outer peripheral ring portion, the steel gear material can be more easily heated to a greater depth in the first protruding portion and the second protruding portion as compared to the coupling portion. Thus, if the heating time is in the above range, the heating depth of the high-frequency induction heating can be easily adjusted so as to be greater in the first protruding portion and the second protruding portion than in the coupling portion with the flange portion and to be substantially the same between the first protruding portion and the second protruding portion.

In the quenching step, the heating depth of the high-frequency induction heating is preferably adjusted so that T/W in the first protruding portion and T/W in the second protruding portion are larger than T/W in the coupling portion with the flange portion, and T/W in the first protruding portion is substantially equal to T/W in the second protruding portion, where T represents the heating depth of the high-frequency induction heating in the direction inward from the tooth bottom of the toothed shape of the outer peripheral surface, and W represents the distance from the tooth bottom of the toothed shape of the outer peripheral surface to the inner peripheral surface.

In this case, the heating depth of the high-frequency induction heating in the first protruding portion, the second protruding portion, and the coupling portion can be adjusted in view of the distance from the tooth bottom of the toothed shape of the outer peripheral surface to the inner peripheral surface. Accordingly, a steel gear can be produced which has high dimensional accuracy with a small OBD taper in the outer peripheral ring portion. Moreover, since not only the carburized layer but also the portion located inward of the carburized layer can be increased in hardness, a steel gear having high strength can be produced. A known unit can be used as a high-frequency induction heating unit.

The method for adjusting the heating depth of the high-frequency induction heating in the first protruding portion, the second protruding portion, and the coupling portion as described above is not particularly limited. Specific examples of the adjusting method include varying the heating time and the input energy of the high-frequency induction heating, varying the clearance between the inner periphery of a coil as the high-frequency induction heating unit and the outer periphery of the tooth tip of the gear, varying the axial width of the coil, adjusting the number of turns in the coil so that the first protruding portion and the second protruding portion are heated more than the coupling portion, and cooling the flange portion during the high-frequency induction heating to preferentially cool only the coupling portion.

In the high-frequency induction heating, it is preferable to hold the distal end of the first protruding portion and the distal end of the second protruding portion with a jig. These distal ends are portions that tend to be excessively heated in the high-frequency induction heating. Thus, holding each distal end with a jig can more easily avoid melting of the distal ends because the heat of each distal end is dissipated by the jig. This is especially effective in the above manufacturing method in which the heating depth of the high-frequency induction heating needs to be adjusted so as to be greater in the first protruding portion and the second protruding portion than in the coupling portion with the flange portion.

Cooling of the steel gear material after the high-frequency induction heating is preferably performed by water cooling. Heating on the toothed shape surface side rather than the entire steel gear material can be accurately performed by using the high-frequency induction heating. Accordingly, even if water-quenching is then performed by using water having a very high cooling effect, occurrence of quenching distortion can be more easily suppressed as compared to the case where the conventional "carburization/oil-quenching treatment" is performed. The excellent rapid cooling effect of the water cooling can improve quenching characteristics, whereby strength of the quenched portion can further be increased. Such increased strength sometimes allows the steel gear material to have required strength even if the carburization treatment is simplified (treatment time is reduced), that is, even if the thickness of the carburized layer is reduced. In this case, the overall time of the heat treatment can further be reduced.

Heating by the high-frequency induction heating is preferably performed by processing the steel gear material one by one, and cooling after the heating is preferably performed by injecting cooling water from around the steel gear material toward the steel gear material while the steel gear material is rotated. This allows the steel gear material to be uniformly cooled in the cooling process, and can further suppress occurrence of distortion.

EMBODIMENTS

Steel gears and manufacturing methods thereof according to embodiments will be specifically described with reference to the accompanying drawings. The steel gears of the embodiments are applied to differential gears. Reference characters are used as appropriate.

First, a schematic configuration of a steel gear according to a first embodiment will be described. As shown in FIGS. 1A and 1B, a steel gear 1 has a substantially cylindrical outer peripheral ring portion 2 having a toothed shape 10 formed on an outer peripheral surface 20a, and a flange portion 3 extended radially inward from an inner peripheral surface 20b of the outer peripheral ring portion 2. The outer peripheral ring portion 2 includes a first protruding portion 21 protruding toward one side in the axial direction with respect to a coupling portion L with the flange portion 3, and a second protruding portion 22 protruding toward the other side in the axial direction with respect to the coupling portion L with the flange portion 3. The axial length of the first protruding portion 21 is substantially the same as that of the second protruding portion 22. In this example, the toothed shape 10 on the outer peripheral surface 20a of the outer peripheral ring portion 2 has a helical shape. The toothed shape 10 is formed by a plurality of teeth 101 as shown in FIG. 2B. A tooth tip 102 is a distal end of the tooth 101. A tooth groove 103 is a space between the teeth 101. A tooth bottom 104 is the bottom of the tooth groove 103. A root circle is a circle connecting the tooth bottoms 104.

As shown in the enlarged views of FIGS. 2A and 2B, a carburized layer 4 and a thermal history layer 5 are formed in the outer peripheral ring portion 2. The carburized layer 4 is formed along the outline of the toothed shape 10 in a surface layer of the toothed shape 10. The thermal history layer 5 is a layer that is present in a region including the carburized layer 4 and having a greater depth T in a direction inward from the outer peripheral surface 20a than the depth of the carburized layer 4. The thermal history layer 5 is a layer having a history of having been heated to austenite by high-frequency induction heating.

According to the steel gear 1 of the present embodiment, as shown in FIG. 2A, in a portion located radially inward of the tooth bottom 104, the thermal history layer 5 is present in a region that includes the carburized layer 4 formed in a surface layer of the tooth bottom 104 and that has a greater depth T in a direction inward from the tooth bottom 104 than the depth of the carburized layer 4. As shown in FIG. 2B, in the tooth 101 of the toothed shape 10, the thermal history layer 5 is present in a region that includes the carburized layer 4 formed in a surface layer of the tooth 101 and that extends from the tooth tip 102 substantially to near the root circle.

In the steel gear 1 of the present embodiment, as shown in FIG. 2A, the depth T of the thermal history layer 5 in the direction inward from the tooth bottom 104 of the toothed shape 10 is greater in the first protruding portion 21 and the second protruding portion 22 than in the coupling portion L with the flange portion 3, and is substantially the same between the first protruding portion 21 and the second protruding portion 22. More specifically, T/W in the first protruding portion 21 and T/W in the second protruding portion 22 are larger than T/W in the coupling portion L with the flange portion 3, and T/W in the first protruding portion 21 is substantially equal to T/W in the second protruding portion 22, where T represents the depth of the thermal history layer 5 in the direction inward from the tooth bottom 104 of the toothed shape 10 of the outer peripheral surface 20a, and W represents the distance from the tooth bottom 104 of the toothed shape 10 of the outer peripheral surface 20a to the inner peripheral surface 20b. That is, the steel gear 1 has such depth distribution that the thermal history layer 5 is deeper in the first protruding portion 21 and the second protruding portion 22 than in the coupling portion L with the flange portion 3. This depth distribution has a depth peak of the thermal history layer 5 on both the first protruding portion 21 side and the second protruding portion 22 side, and these two depth peaks are substantially the same.

Evaluation results of a method for manufacturing a steel gear according to the first embodiment and a steel gear of the first embodiment produced by this manufacturing method will be described.

First, a steel gear material having a shape shown in FIGS. 1A and 1B was prepared by hot forging by using SCM420 (JIS) suitable for carburization as a material. The axial length of the first protruding portion 21 of the steel gear material (the distance from a coupling position L1 on the first protruding portion 21 side of the flange portion 3 to the distal end of the first protruding portion 21) is set to 11 mm, and the axial length of the second protruding portion 22 (the distance from a coupling position L2 on the second protruding portion 22 side of the flange portion 3 to the distal end of the second protruding portion 22) is set to 11 mm. The thickness of the flange portion 3 is set to 8 mm. The flange portion 3 has a plurality of insertion holes 31 in the circumferential direction in which fastening members such as bolts are inserted therethrough. In this example, the value W in the outer peripheral ring portion 2 of the steel gear material is set to a fixed value of 8.88 mm along the entire axial length.

Next, the steel gear material thus prepared was subjected to the "carburization, slow cooling, and high-frequency quenching treatment." This will be specifically described.

FIGS. 3A and 3B show heat patterns of the temperature of the steel gear material during heat treatment, where the abscissa represents time and the ordinate represents temperature. As shown by a heat pattern A of FIG. 3A, the method for manufacturing a steel gear according to the first embodiment is a method of performing a carburizing step a1 of heating a steel gear material to a carburization temperature of 950° C. for 70 minutes and holding the steel gear material at this temperature for 80 minutes, and after the carburizing step a1, performing a cooling step a2 of slowly cooling the steel gear material to a temperature of 150° C. or less for 40 minutes, and then performing a quenching step a3 of rapidly heating the steel gear material again to a quenching temperature of 950° C. by high-frequency induction heating and then water-quenching the steel gear material.

The method for manufacturing a steel gear according to the first embodiment is performed by using a heat treatment facility including: a prewash tank that is used to wash the steel gear material before the carburizing step a1; a reduced-pressure carburization/slow cooling apparatus including a heating chamber, a reduced-pressure carburizing chamber, and a reduced-pressure cooling chamber; a high-frequency quenching apparatus; and a magnetic particle inspection apparatus that is used to inspect for defects.

As shown by, e.g., a heat pattern B of FIG. 3B, a method for manufacturing a steel gear, which is conventionally widely known in the art, is a method of performing a carburizing step b1 of heating a steel gear material to a carburization temperature of 950° C. for 70 minutes and holding the steel gear material at this temperature for 220 minutes, then performing a step b2 of holding the steel gear material at a quenching temperature of 850° C. and thereafter oil-quenching the steel gear material, and performing a post-wash step b3 of washing off the cooling oil adhering to the steel gear material during the oil-quenching, and a tempering step b4.

The conventional method for manufacturing a steel gear, which has the heat pattern B of FIG. 3B, is performed by using a heat treatment facility including: a prewash tank that is used to wash a steel gear material before the carburizing step b1; a long large carburizing furnace including a carburizing furnace for heating and carburization and a quenching oil tank; a post-wash tank that is used to wash the steel gear material after the carburization and oil-quenching; and a tempering furnace that is used to perform a tempering treatment. The method for manufacturing a steel gear according to the first embodiment uses neither fire nor oil and can reduce the heat treatment time, as compared to the conventional method for manufacturing a steel gear, which uses the "carburization/oil-quenching treatment." Thus, the method for manufacturing a steel gear according to the first embodiment can reduce $CO_2$ emission and is earth-friendly. Moreover, since the length of the heat treatment line can be reduced, a compact manufacturing line of steel gears can be configured.

The method for manufacturing a steel gear according to the first embodiment was performed as follows by using the heat treatment facility described above. Specifically, in the manufacturing method of the present embodiment, as shown by the heat pattern A of FIG. 3A, the carburizing step a1 of carburizing a steel gear material prepared in a carburizing gas under a reduced pressure lower than the atmospheric pressure was performed, and after the carburizing step a1, the cooling step a2 of cooling the steel gear material in a cooling gas having a reduced pressure lower than the atmospheric pressure, and the quenching step a3 of heating the cooled steel gear material again by high-frequency induction heating and then water-quenching the steel gear material were performed.

The carburizing step a1 was performed by holding a steel gear material at 950° C., a temperature equal to or higher than the austenitizing temperature, for 80 minutes as a carburizing treatment formed by a carburizing period and a diffusion period. In this case, the reduced-pressure carburizing chamber was depressurized to 1 to 3.5 hPa, and acetylene was used as the carburizing gas.

Reduced-pressure slow cooling was used for cooling in the cooling step a2. In this case, the cooling was performed under a decompression condition at 600 hPa. Nitrogen (N) was used as the cooling atmosphere gas. The steel gear material was cooled at a rate in the range of 0.1 to 3.0° C./sec. from the temperature equal or higher than the austenitizing temperature, namely the temperature immediately after the carburization treatment, to 150° C. that is lower than an Al transformation temperature.

As shown in FIG. 3A, the quenching step a3 includes a temperature rising step a31 of heating the tooth-shaped surface side of the outer peripheral ring portion 2 of the steel gear material to a temperature equal to or higher than the austenitizing temperature by high-frequency induction heating, and a rapid cooling step a32 of injecting water to water-quench the steel gear material so that a cooling rate equal to or higher than a rapid-cooling critical cooling rate that causes martensitic transformation can be easily obtained in the carburized layer 4.

The temperature rising step a31 was performed for a relatively long time of 25 seconds with energy input of about 1,800 kJ in the high-frequency induction heating. The rapid cooling step a32 was performed for 14 seconds, and the cooling rate was 50 to 60° C./sec.

In this case, as shown in FIG. 4, the heating of the tooth-shaped surface side of the outer peripheral ring portion 2 was performed while the distal end of the first protruding portion 21 and the distal end of the second protruding portion 22 of the outer peripheral ring portion 2 were held with jigs 9a, 9b. Since the heat of each distal end is dissipated by the jigs 9a, 9b, melting of the distal ends due to overheat can be easily prevented. Moreover, a coil 8 having the same axial width as the steel gear material was used as the high-frequency induction heating unit, and the coil 8 was placed so as to face the outer peripheral surface 20a having the toothed shape 10 formed thereon and to be separated from the outer peripheral surface 20a. The separation distance was 2 mm.

The heating depth T of the high-frequency induction heating in the direction inward from the tooth bottom 104 of the toothed shape 10 of the outer peripheral surface 20a was adjusted to be greater in the first protruding portion 21 and the second protruding portion 22 than in the coupling portion L with the flange portion 3, and to be substantially the same between the first protruding portion 21 and the second protruding portion 22, by cooling in the high-frequency induction heating. More specifically, the heating depth of the high-frequency induction heating was adjusted so that T/W in the first protruding portion 21 and T/W in the second protruding portion 22 are larger than T/W in the coupling portion L with the flange portion 3, and that T/W in the first protruding portion 21 is substantially equal to T/W in the second protruding portion 22, where T represents the heating depth of the high-frequency induction heating in the direction inward from the tooth bottom 104 of the toothed shape 10 of the outer peripheral surface 20a, and W represents the distance from the tooth bottom 104 of the toothed shape 10 of the outer peripheral surface 20a to the inner peripheral surface 20b. Manufacturing of the steel gear 1 according to the first embodiment was thus carried out to produce the steel gear 1 according to the first embodiment.

Figure 5:
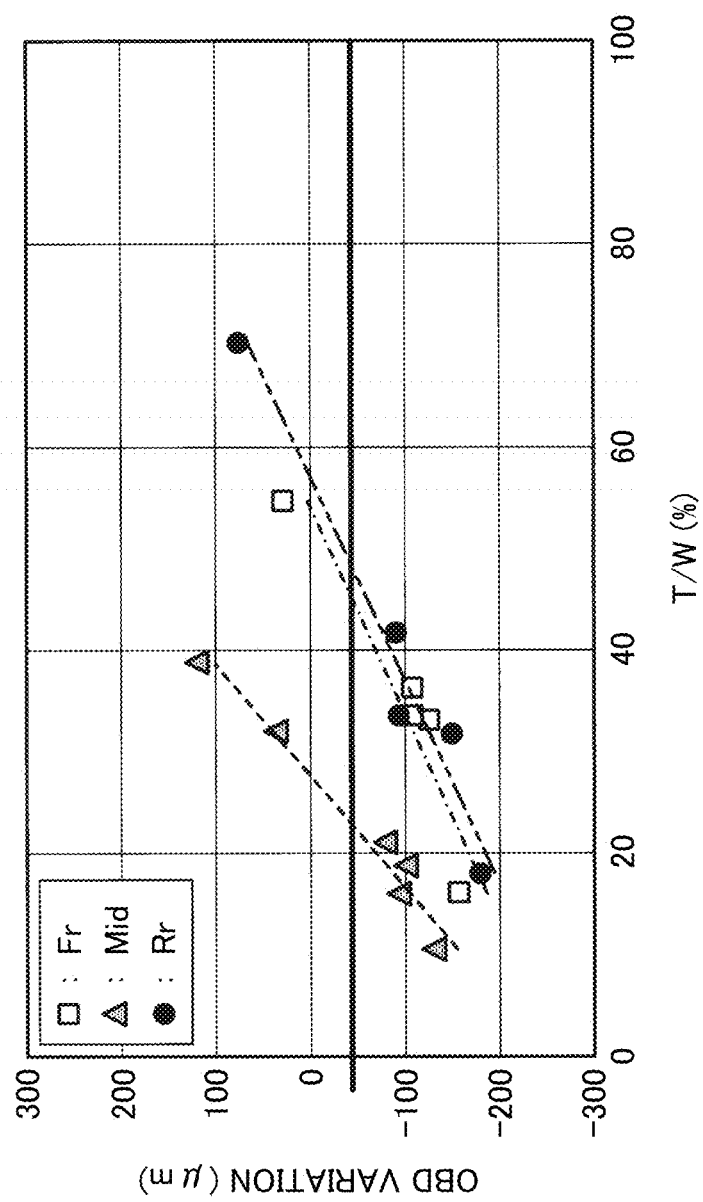
FIG. 5 illustrates the relation between T/W (%) and OBD variation in the embodiment.

In the quenching step a3, the heating depth T of the high-frequency induction heating in the direction inward from the tooth bottom 104 of the toothed shape 10 of the outer peripheral surface 20a was adjusted to be greater in the first protruding portion 21 and the second protruding portion 22 than in the coupling portion L with the flange portion 3, and to be substantially the same between the first protruding portion 21 and the second protruding portion 22. This is based on the following test results. FIG. 5 is a plot of an OBD variation (μm) at predetermined positions of the outer peripheral ring portion 2 in the case where T/W (%) was adjusted to various values by using various heating conditions in the high-frequency induction heating.

As shown in FIG. 2A, the predetermined positions of the outer peripheral ring portion 2 are the position located 3 mm inside from the distal end of the first protruding portion 21 toward the flange portion 3 (hereinafter referred to as the "position Fr"), the position located in the center of the outer peripheral ring portion 2 in the axial direction (the midpoint of the tooth width, the coupling portion L with the flange portion 3) (hereinafter referred to as the "position Mid"), and the position located 3 mm inside from the distal end of the second protruding portion 22 toward the flange portion 3 (hereinafter referred to as the "position Rr"). The OBD variation was obtained from the difference between the OBD value at each predetermined position of the steel gear 1 after the quenching step a3 and the OBD value at each predetermined position of the steel gear material after the cooling step a2. As shown in FIG. 1A, balls OB1, OB2 are placed in the two opposing tooth grooves, and the outer peripheral dimension at each position is measured along the entire circumference by using a special OBD measuring instrument. The OBD value is a mean value of the measurement values thus obtained.

As can be seen from FIG. 5, there is a correlation between T/W (%) and OBD variation (μm). It can also be seen from FIG. 5 that the OBD variations at the positions Fr and Rr can be made approximately equal to the OBD variation at the position Mid by making the ratios T/W at the positions Fr and Rr higher than the ratio T/W at the position Mid, and that the OBD variations at the positions Fr and Rr can be made approximately equal to each other by making the ratios T/W at the positions Fr and Rr approximately equal to each other. That is, this test result shows that the steel gear 1 having a small OBD taper can be obtained by adjusting the heating depth of the high-frequency induction heating so that T/W in the first protruding portion 21 and T/W in the second protruding portion 22 are larger than that in the coupling portion L with the flange portion 3 and that T/W in the first protruding portion 21 is substantially equal to that in the second protruding portion 22. The test result also shows that in order that a constant OBD variation (e.g., horizontal line in the figure) is obtained, T/W in the first protruding portion 21 and the second protruding portion 22 is preferably adjusted to the range of 30 to 60%, more preferably 35 to 55%, and more preferably 40 to 50%, and T/W in the coupling portion L with the flange portion 3 is preferably adjusted to the range of 10 to 35%, and more preferably 15 to 30%.

Figure 6:
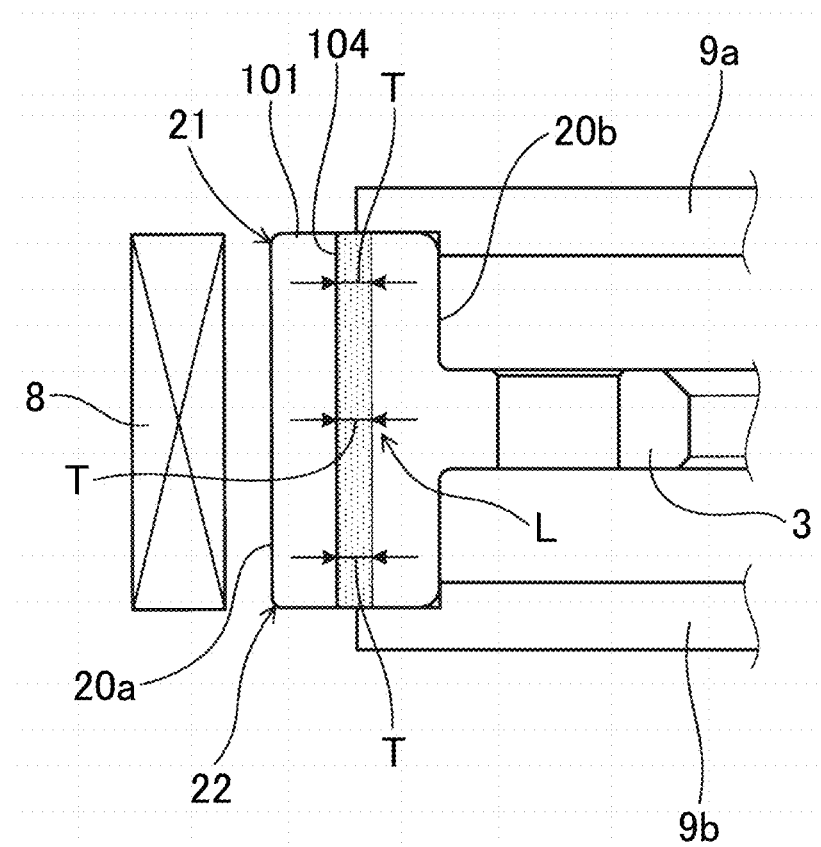
FIG. 6 illustrates a condition during high-frequency induction heating in a method for manufacturing a steel gear according to a first comparative example.

As a comparative example of the method for manufacturing the steel gear 1 according to the first embodiment, as shown in FIG. 6, manufacturing of a steel gear according to a first comparative example was performed to produce a steel gear according to the first comparative example. The steel gear of the first comparative example was produced in a manner substantially similar to that of the first embodiment except that the heating depth T of the high-frequency induction heating in the direction inward from the tooth bottom 104 of the toothed shape 10 of the outer peripheral surface 20a was adjusted so as to be substantially the same along the entire axial length of the outer peripheral ring portion 2. This adjustment of the heating depth T was made in a manner similar to that of the manufacturing method of the present embodiment except that in the temperature rising step a31 the energy input was about 1,400 kJ and the heating time was 13 seconds in the high-frequency induction heating.

Figure 7:
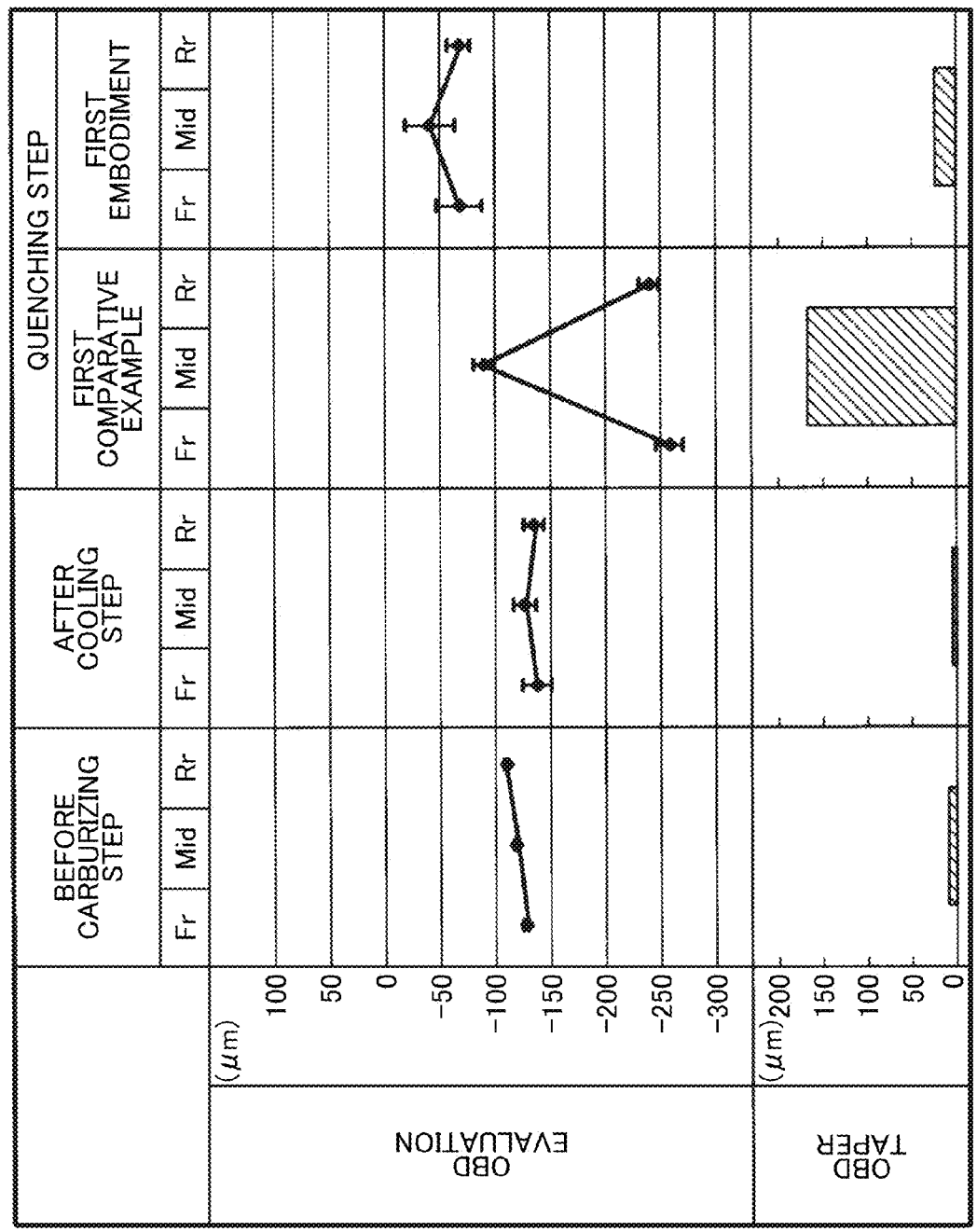
FIG. 7 illustrates distortion of steel gear materials after each step in the methods for manufacturing a steel gear according to the first embodiment and the first comparative example, and the steel gears according to the first embodiment and the first comparative example.

Distortion in the steel gear materials after each step in the methods for manufacturing a steel gear according to the first embodiment and the first comparative example, and in the steel gears of the first embodiment and the first comparative example produced by these manufacturing methods was examined. The result is shown in FIG. 7. The OBD value in FIG. 7 is a value measured by the method described above. The OBD taper is an absolute value of the difference between the OBD value at the position Mid and a larger one of the OBD value at the position Fr and the OBD value at the position Rr. In each column of FIG. 7, a maximum value, a minimum value, and a mean value are plotted for each of the three positions Fr, Mid, and Rr, and the maximum value and the minimum value are connected together with a line. The mean values at the three positions are connected together with a line.

FIG. 7 shows that only a steel gear having low dimensional accuracy and having a distorted shape with a large OBD taper can be obtained according to the first comparative example, and that a steel gear having high dimensional accuracy and having a shape with a small OBD taper can be obtained according to the first embodiment. The reason for this can be considered as follows.

The following mechanism is possible in the case where the heating depth T of the high-frequency induction heating in the direction inward from the tooth bottom 104 is adjusted to a uniform depth along the entire axial length of the outer peripheral ring portion 2 as in the first comparative example shown in FIGS. 8A to 8C. The coupling portion L with the flange portion 3 in the outer peripheral ring portion 2 is subjected to a large constraining force of the flange portion 3. On the other hand, the distal ends of the first protruding portion 21 and the second protruding portion 22 are subjected to a smaller constraining force of the flange portion 3 than the coupling portion L because they are separated from the flange portion 3. Accordingly, in the high-frequency induction heating, the distal end sides of the first protruding portion 21 and the second protruding portion 22 are slightly deformed radially outward to approximately the same extent by thermal expansion (arrow R), and the coupling portion L is less likely to be deformed radially outward by thermal expansion as compared to the distal end sides. When cooling is performed by quenching in this state, the coupling portion L is less likely to be deformed radially inward due to the presence of the flange portion 3, but the distal end sides of the first protruding portion 21 and the second protruding portion 22 having no flange portion 3 are deformed radially inward to a large extent (arrow r). A steel gear having a deformed shape with a large OBD taper was thus produced in the first comparative example.

On the other hand, the following mechanism is possible in the case where the heating depth T of the high-frequency induction heating in the direction inward from the tooth bottom 104 is adjusted so as to be greater in the first protruding portion 21 and the second protruding portion 22 than in the coupling portion L with the flange portion 3 and to be substantially the same between the first protruding portion 21 and the second protruding portion 22 as in the first embodiment shown in FIGS. 9A to 9C. In the case where the heating depth T is adjusted in this manner, the distal end side of the first protruding portion 21 and the distal end side of the second protruding portion 22 are more significantly deformed radially outward to approximately the same extent in the high-frequency induction heating (arrow R1) as compared to the case where the heating depth T is adjusted to a uniform depth. When cooling is performed by quenching in this state, the distal end side of the first protruding portion 21 and the distal end side of the second protruding portion 22 are deformed radially inward to approximately the same extent as that in the high-frequency induction heating (arrow r1). A steel gear having a shape with a small OBD taper is thus finally produced.

Figure 10A:
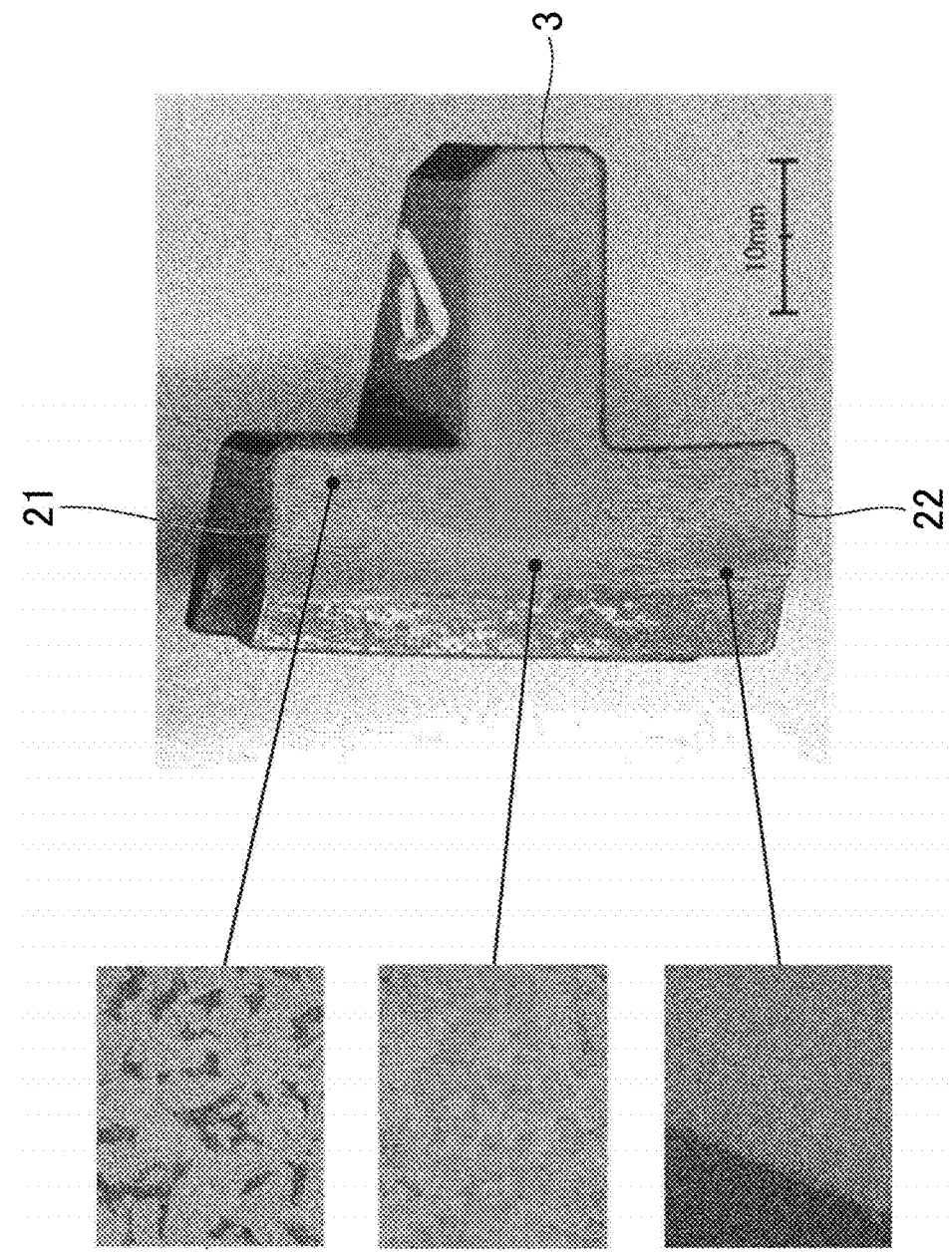
FIGS. 10A to 10D show an image of a cut surface of the steel gear according to the first embodiment and images of metallic structures, where
Figure 10B:
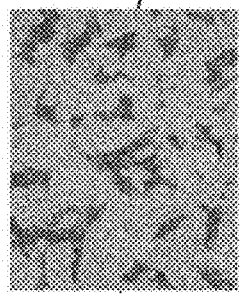

The steel gear according to the first embodiment was cut along the tooth bottom 104 of the toothed shape 10, and metallographic observation of the cut surface was conducted. Specifically, the cut surface was corroded with an alcohol solution containing 3 to 5% of nitric acid, and observed with an optical microscope. FIGS. 10A to 10D show an image of the cut surface of the steel gear of the first embodiment and images of metallic structures. As shown in FIG. 10D, formation of the carburized layer 4 in the surface layer of the tooth bottom 104 can be found in the cut surface. As shown in FIG. 10A, the carburized layer 4 is a layer mainly comprised of a martensitic structure.

It can also be seen from the cut surface that a layer having a greater depth in the first protruding portion 21 and the second protruding portion 22 than in the coupling portion L with the flange portion 3 is present in a portion including the carburized layer 4 and having a greater depth in the direction inward from the outer peripheral surface 20a (in this case, the tooth bottom 104) of the outer peripheral ring portion 2 than the depth of the carburized layer 4. It can be found that this layer has substantially the same depth peak substantially in the center of the first protruding portion 21 and in the center of the second protruding portion 22 in the axial direction. This layer is colored different from a portion located inward of this layer, and the presence of a boundary line can be found. A metallic structure was examined in the region other than the carburized layer 4, which extends from the outer peripheral surface 20a of the outer peripheral ring portion 2 to the boundary line. As shown in FIG. 10B, this region was mainly comprised of a ferrite structure and a martensitic structure. In this example, this layer corresponds to the thermal history layer 5. The depth of the thermal history layer 5 was about 5.3 mm at the position Fr, about 3.4 mm at the position Mid, and about 5.3 mm at the position Rr.

Figure 10C:
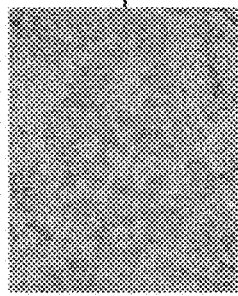
Figure 10D:
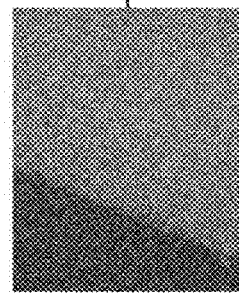

As shown in FIG. 10C, the portion located inward of the thermal history layer 5 was mainly comprised of a ferrite structure and a pearlite structure. This result shows that the thermal history layer 5 is a layer that has a history of having been heated to austenite by high-frequency induction heating, and the portion located inward of the thermal history layer is a layer that has not been heated to austenite by the high-frequency induction heating. The boundary line can be found as described above because the metallic structure, crystal grain size, etc. are different between the portion located outside the boundary line and the portion located inside the boundary line. In this example, the thermal history layer 5 includes a ferrite structure and a martensitic structure. Accordingly, internal hardness of the steel gear 1 can be adjusted by adjusting the depth T of the thermal history layer 5 and the magnitude of T/W. Surface carbon concentration of the carburized layer 4 at the position located 50 μm from the surface of the outer peripheral surface 20a was measured with an X-ray microanalyzer. The surface carbon concentration was 0.6%.

Figure 11:
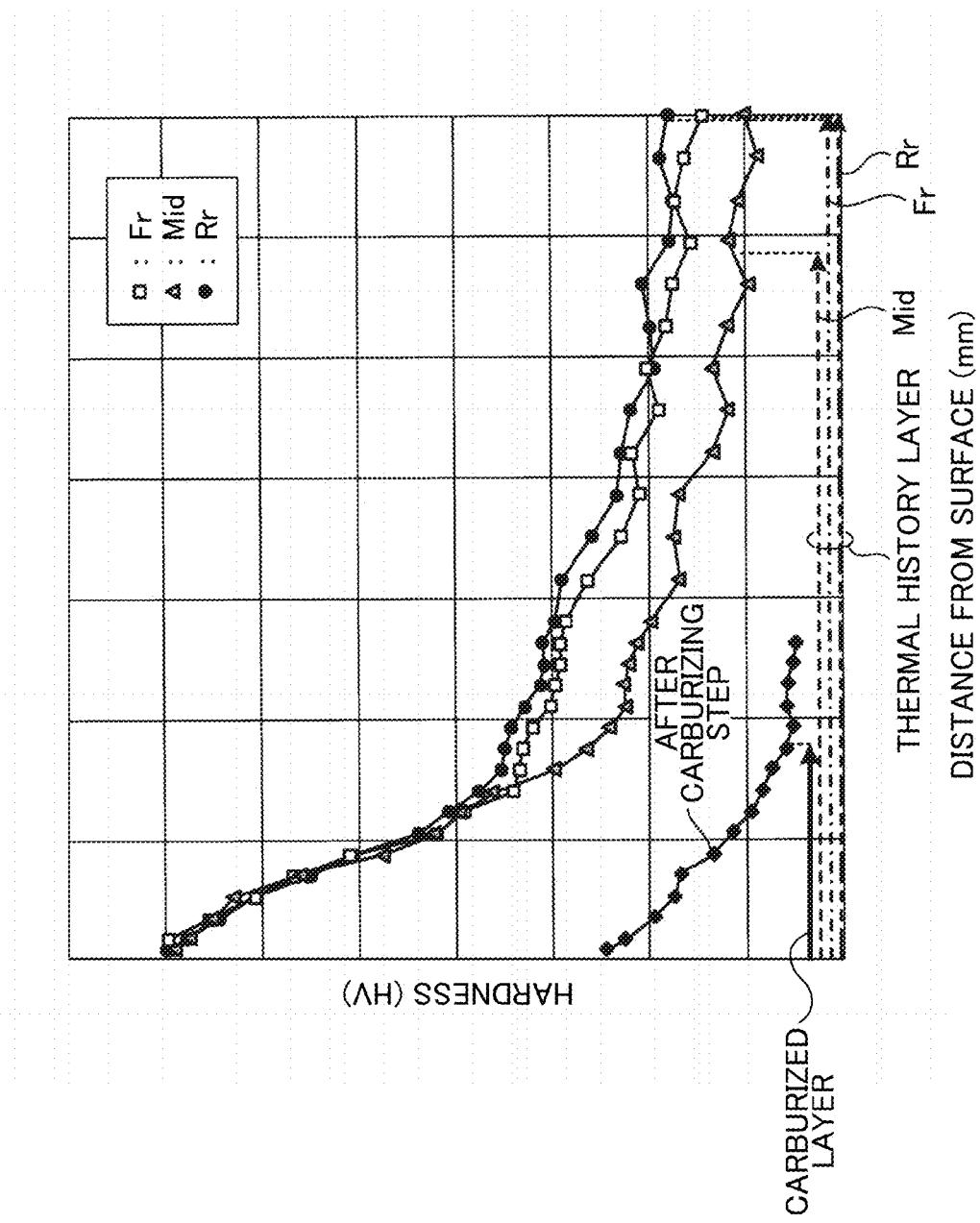
FIG. 11 illustrates hardness distribution of the steel gear according to the first embodiment.

Then, hardness distribution of the steel gear according to the first embodiment was measured. Specifically, Vickers hardness (Hv, test load of 0.3 kgf) was measured with respect to the distance from the surface of the tooth bottom 104 of the steel gear according to the first embodiment. The result is shown in FIG. 11. In FIG. 11, the depth of the carburized layer 4 and the depths of the thermal history layer 5 at the positions Fr, Mid, and Rr are also shown by arrows.

According to FIG. 11, the steel gear has substantially the same hardness at the positions Fr, Mid, and Rr to the depth of the carburized layer 4, and thus uniform surface hardness was able to be given to the tooth-shaped surface. The steel gear has different hardnesses at the positions Fr, Mid, and Rr in the inner region of the thermal history layer 5 which is deeper than the carburized layer 4. Specifically, the hardness is substantially the same at the positions Fr and Rr, and is reduced at the position Mid. This is because the heating depth of the high-frequency induction heating was adjusted so as to be greater in the in the first protruding portion 21 and the second protruding portion 22 than in the coupling portion L with the flange portion 3 and to be substantially the same between the first protruding portion 21 and the second protruding portion 22. According to this result, effective case-hardening depth can be ensured by adjusting the depth T of the thermal history layer 5 and the magnitude of T/W, and dimensional accuracy of the steel gear can be adjusted by high-frequency induction heating.

Although the embodiment is describe above, the present invention is not limited by the embodiment, and various modifications can be made without departing from the spirit and scope of the present invention.

The invention claimed is:

1. A steel gear comprising:
    a substantially cylindrical outer peripheral ring portion having a toothed shape formed on its outer peripheral surface; and a flange portion extended radially inward from an inner peripheral surface of the outer peripheral ring portion, wherein
    the outer peripheral ring portion includes a first protruding portion protruding to one side in an axial direction with respect to a coupling portion with the flange portion, and a second protruding portion protruding to the other side in the axial direction with respect to the coupling portion with the flange portion, and an axial length of the first protruding portion is substantially equal to that of the second protruding portion,
    a carburized layer that is formed in a surface layer of the toothed shape and a thermal history layer that is formed in a region including the carburized layer and having a greater depth in a direction inward from the outer peripheral surface than a depth of the carburized layer and that has a history of having been heated to austenite by high-frequency induction heating are formed in the outer peripheral ring portion, and
    a depth of the thermal history layer in a direction inward from a tooth bottom of the toothed shape of the outer peripheral surface is greater in the first protruding portion and the second protruding portion than in the coupling portion with the flange portion, and is substantially the same between the first protruding portion and the second protruding portion,
    wherein in the outer peripheral ring portion, the carburized layer is comprised of a martensitic structure, the thermal history layer other than the carburized layer is comprised of a ferritic-martensitic structure, and a portion located inward of the thermal history layer is comprised of a ferrite-pearlite structure.

2. The steel gear according to claim 1, wherein
    T/W in the first protruding portion and T/W in the second protruding portion are larger than T/W in the coupling portion with the flange portion, and T/W in the first protruding portion is substantially equal to T/W in the second protruding portion,
    where T represents the depth of the thermal history layer in the direction inward from the tooth bottom of the toothed shape of the outer peripheral surface, and W represents a distance from the tooth bottom of the toothed shape of the outer peripheral surface to the inner peripheral surface.

3. The steel gear according to claim 2, wherein
    in the outer peripheral ring portion, the carburized layer is comprised of a martensitic structure, the thermal history layer other than the carburized layer is comprised of a ferritic-martensitic structure, and a portion located inward of the thermal history layer is comprised of a ferrite-pearlite structure.

\* \* \* \* \*